Patented June 22, 1954

2,681,941

UNITED STATES PATENT OFFICE 2,681,941

FLUORINATED PENTENES

Robert P. Ruh and Arthur F. Gordon, Midland, Mich., assignors to Dow Corning Corporation, Midland, Mich., a corporation of Michigan No Drawing. Application December 26, 1951, Serial No. 263,495

1 Claim. (Cl. 260—653)

This invention relates to a fluorinated linear pentene.

It is an object of this invention to prepare economically a fluorinated compound which is useful as an additive for lubricants and as a fire extinguisher fluid.

This invention relates to an unsaturated linear compound having the empirical formula $C_5HCl_4F_5$ having a boiling point of about 147° C. at 738 mm.

This material may be prepared by reacting the chlorinated pentene of the formula

$$CCl_2=CClCCl_2CHClCCl_3$$

with antimony trifluoride at a temperature of from 100° C. to 250° C.

The compound of this invention is noninflammable, has a low freezing point, and excellent compatibility with siloxane fluids. It is useful as an additive for lubricants both siloxane and organic and as a fire extinguisher fluid.

The following example is illustrative only and should not be construed as limiting the invention which is properly set forth in the appended claim.

Example

A mixture of 32 gram mols of

$$CCl_2=CClCCl_2CHClCCl_3$$

and 54 gram mols of $SbF_3$ were heated in a nickel-copper autoclave at 200° C. for 5 hours at a pressure of 200 to 240 p. s. i. The product was washed with 17 per cent HCl until free of antimony salts and then with water until neutral. It was finally dried over calcium sulfate and the 8037 grams of product which was obtained was distilled to give the compound $C_5HCl_4F_5$ boiling 147° C. at 738 mm. and having a density at 25° C. of 1.6674 and a refractive index at 25° C. of 1.4190. The material was analyzed and found to contain 31.7 per cent F, 47.6 per cent Cl, 20.4 per cent C, and 0.5 per cent H. The freezing curve indicated that this material was a mixture of isomers.

In addition there was obtained the compound $C_5Cl_5F_3$.

That which is claimed is:

A linear unsaturated compound having the empirical formula $C_5HCl_4F_5$ and a boiling range of about 147° C. at 738 mm.

No references cited.